United States Patent
Uematsu

(10) Patent No.: US 7,176,709 B2
(45) Date of Patent: Feb. 13, 2007

(54) RECEIVING DEVICE

(75) Inventor: Akira Uematsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 90 days.

(21) Appl. No.: 11/019,191

(22) Filed: Dec. 23, 2004

(65) Prior Publication Data

US 2005/0140424 A1 Jun. 30, 2005

(30) Foreign Application Priority Data

Dec. 25, 2003 (JP) ............................. 2003-429996

(51) Int. Cl.
*H03K 19/003* (2006.01)
*H03H 7/38* (2006.01)
*H03L 5/00* (2006.01)

(52) U.S. Cl. ........................... 326/30; 326/27; 326/68; 326/86; 327/333; 333/17.3; 333/32

(58) Field of Classification Search ............ 326/26–27, 326/30, 68, 82–83, 86; 327/333; 333/17.3, 333/32

See application file for complete search history.

(56) References Cited

U.S. PATENT DOCUMENTS

| | | | |
|---|---|---|---|
| 3,919,643 A * | 11/1975 | Templin | ................... 455/115.1 |
| 5,111,080 A | 5/1992 | Mizukami et al. | |
| 5,317,214 A | 5/1994 | Lewis | |
| 5,578,944 A | 11/1996 | Sasaki | |
| 6,597,229 B1 | 7/2003 | Koyata et al. | |
| 6,628,223 B2 * | 9/2003 | Nagano | ....................... 341/155 |
| 2003/0087671 A1 | 5/2003 | Ruha et al. | |
| 2005/0052200 A1 * | 3/2005 | Nguyen et al. | ................ 326/30 |
| 2006/0097753 A1 * | 5/2006 | Shibata et al. | ................ 326/83 |

FOREIGN PATENT DOCUMENTS

| | | |
|---|---|---|
| JP | A 63-1211 | 1/1988 |
| JP | A 06-268507 | 9/1994 |
| JP | A 08-162942 | 6/1996 |
| JP | A 09-130227 | 5/1997 |
| JP | B2 2919012 | 4/1999 |
| JP | A 2001-053598 | 2/2001 |
| JP | A 2002-374161 | 12/2002 |
| JP | A 2005-236931 | 9/2005 |

OTHER PUBLICATIONS

Tietze et al., "Halbleiter-Schaltungstechnik," Springer-Verlag, Berlin Heidelberg New York, 1986, p. 663, no month.

* cited by examiner

*Primary Examiner*—Rexford Barnie
*Assistant Examiner*—Jason Crawford
(74) *Attorney, Agent, or Firm*—Oliff & Berridge, PLC

(57) ABSTRACT

An exemplary embodiment matches the input impedance of the receiving device to characteristic impedance, even with the receiving device composed with the MOS transistor, with a receiving device for data transfer with the differential-current driven model including: a receiving node to receive a differential current signal; a current-voltage conversion device to convert current into a voltage corresponding to differential current signal from the receiving node; an impedance matching device to match the input impedance to characteristic impedance, including a low impedance circuit device that enables generation of a low impedance which is lower than the characteristic impedance of a sending-side transmission line that is connected to the receiving node as an input impedance of the receiving node; and a comparator into which a differential-voltage signal from the current-voltage conversion device is input as a comparison signal, and which outputs the comparison result thereof as an output data.

5 Claims, 3 Drawing Sheets

RECEIVING DEVICE

BACKGROUND

An exemplary embodiment of the present invention relates to a receiving device for data transfer with a differential-current driven model that uses current as a signal transmission device.

As the operation speed of semiconductor integrated devices or central processing units (CPU) and the like that construct electronic apparatuses increases, or the quantity of signals to process rise to mass quantity, there is a growing need to transmit signals in high speed through a transmission line between the electronic apparatuses, or between the circuits that construct the electronic apparatus.

The related art includes developments in a high-speed interface circuit that uses current as the signal transmission device. Signals are transmitted through a transmission line among the electronic apparatuses, or between the circuits that compose the electronic apparatus, in order to address or resolve the drawbacks of the occurrence of signal response delay and the like. Signal response delay and the like are caused by the capacity constituent of the transmission line in case where the voltage is used as the signal transmission device. For example, a technology referred to as Low Voltage Differential Signaling (LVDS) can be developed (See Japanese Unexamined Patent Publication No. 2001-53598).

This LVDS technology receives signals by driving a constant-current source applied in a sending device with two reverse voltages fluctuating in low voltage (low amplitude), flowing differential current into two transmission lines, and extracting the fluctuation of the differential current that flows as voltage fluctuations in the terminal resistor applied in the receiving device.

However, the electromagnetic property will appear if the wiring length between the circuits that transmit signals is longer than one forth of the wavelength of the high-frequency constituent in the transmitted signal. Thus, the phenomenon of radiation, etc., occurs and waveform deteriorates. In order to reduce or avoid radiation and transmit the signals without waveform deterioration, wiring needs to be designed and constructed as a transmission cable line, and with the characteristic impedance of the transmission cable line, there is a need to terminate the sending circuit side or the receiving circuit side, or both sides, and conduct an impedance matching (for example, see Japanese Patent Publication No. 2919012).

SUMMARY

As described above, it may be advantageous to terminate the sending circuit side or the receiving circuit side, or both sides, and conduct an impedance matching, with the characteristic impedance of the transmission cable line. However, since in the receiving part of the interface circuit for data transfer with the differential-current driven model mentioned in JP2001-53598, the gates of the metal oxide semiconductor transistor (MOS transistor) 33 and the MOS transistor 34 that correspond to the terminal part of the transmission line, are fixed to the electric-potential that is biased with constant-voltage VB. Thus, the input impedance of the receiving part is high, 250 Ω through 500 Ω. The characteristic impedance Z0 of the transmission line between the sending device and the receiving device in the LVDS is about 50 Ω. In contrast, the matching circuit shown in JP 2919012 has a structure wherein the bipolar transistor is used, and is not related to the device, using a MOS transistor. Therefore, in a device such as a semiconductor integrated circuit wherein the MOS transistors are used, it is not easy to match impedance.

In an exemplary embodiment, a receiving device is provided that is able to match the input impedance to the characteristic impedance of the transmission line, even with a receiving device constructed using the MOS transistor.

In an exemplary embodiment, the receiving device for data transfer with a differential-current driven model, comprising: a first receiving node connected to a first transmission line and a second receiving node connected to a second transmission line for receiving a differential current signal; a first current-voltage conversion device to convert current into a voltage corresponding to a first current signal from the first receiving node; a first impedance matching device to match input impedance to characteristic impedance of the first transmission line, installed between the first receiving node and the first current-voltage conversion device, including a first low impedance circuit device that enables generation of a low impedance which is lower than the characteristic impedance of the first transmission line that is connected to the first receiving node as an input impedance of the first receiving node; a second impedance matching device to match input impedance to characteristic impedance of the second transmission line, installed between the second receiving node and the second current-voltage conversion device, including a second low impedance circuit device that enables generation of a low impedance which is lower than the characteristic impedance of the second transmission line that is connected to the second receiving node as an input impedance of the second receiving node; and a comparator into which a differential-voltage signal from the first and the second current-voltage conversion devices input as a comparison signal, and outputs a comparison result thereof as an output data.

In exemplary embodiments, even with the receiving device constructed using MOS transistor, it is trivial to match the input impedance of the receiving device to the characteristic impedance of the transmission line.

In exemplary embodiments, the first low impedance circuit device including: a first current control device to control the current flowing between the first current-voltage conversion device and the first receiving node; a first voltage inversion device to invert the output terminal voltage of the first current control device, and supply the inverted voltage to the first current control device as a control signal; a second current control device to control the current flowing between the second current-voltage conversion device and the second receiving node; and a second voltage inversion device to invert the output terminal voltage of the second current control device, and supply the inverted voltage to the second current control device as a control signal.

In exemplary embodiments, the first impedance matching device having a structure, where, among the impedances necessary for impedance matching with the first transmission line, an impedance that is smaller than the impedance necessary to match being generated by the first low impedance circuit device, and a deficiency of impedance necessary to match being compensated with a resistor; and the second impedance matching device having a structure, where, among the impedances necessary for impedance matching with the second transmission line, an impedance that is smaller than the impedance necessary to match being generated by the second low impedance circuit device, and a deficiency of impedance necessary to match being compensated with a resistor.

In exemplary embodiments, even with the semiconductor integrated device having a slightly different specification in the characteristic impedance of the transmission cable line, it is possible to trivially conduct the adjustment with resistor.

In exemplary embodiments, the first impedance matching device having a structure that makes the impedance generated by the first low impedance circuit device almost zero, and compensates almost the entire impedance necessary to match with a first resistor, the second impedance matching device having a structure that makes the impedance generated by the second low impedance circuit device almost zero, and compensates almost the entire impedance necessary to match with a second resistor.

DETAILED DESCRIPTION OF PREFERRED EMBODIMENTS

Exemplary embodiments of the present invention are described with reference to the drawings.

[Exemplary Embodiment 1]

Figure 1:
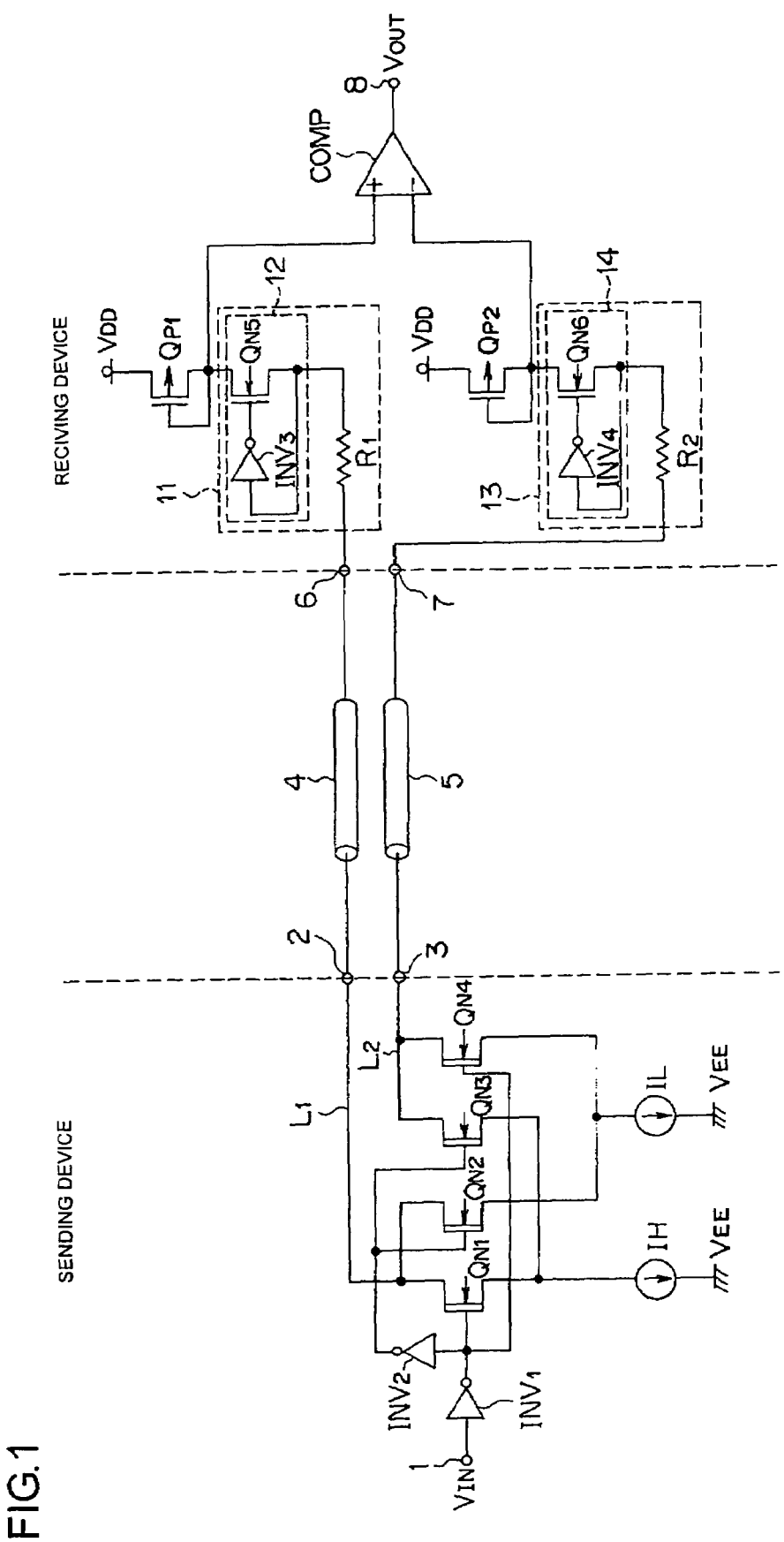
FIG. 1 is a schematic to show sending and receiving devices of exemplary embodiment 1 of the present invention.

FIG. 1 is a schematic showing a sending and a receiving device in an exemplary embodiment 1 of the present invention.

In FIG. 1, both the sending and the receiving devices have semiconductor integrated circuits. A data signal VIN, '1' or '0', may be input into an input terminal 1, and data signals inverted through an inverter INV1 may be input into the gates of negative metal oxide semiconductor transistors (NMOS transistors) QN1 and QN4. The data signals inverted through the inverter INV1 may further be inverted through an inverter INV2, and input into the gates of NMOS transistors QN2 and QN3. The sources of NOMS transistors QN1 and QN3 may both be connected to a low electric-potential point (standard electric-potential point) VEE via a constant current source IL. The sources of NMOS transistors QN2 and QN4 may both be connected to the low electric-potential point (standard electric-potential point) VEE via a constant current source IL. Further, the drains of the NMOS transistors QN1 and QN2 may both be connected to an output terminal 2 via a line L1, and the drains of the NMOS transistors QN3 and QN4 may be connected to an output terminal 3 via a line L2. Consequently, if the output from the inverter INV1 is '1', the NMOS transistors QN1 and QN4 are turned on concurrently. Thus, it is possible for the constant current IH to flow from the output terminal 2 in the line L1 to the low electric-potential point VEE through the NMOS transistor QN1, as well as for the constant current IL to flow from the output terminal 3 in the line L2 to the low electric-potential point VEE through the NMOS transistor QN4. Moreover, if the output from the inverter INV1 is '0', the NMOS transistors QN2 and QN3 are turned on concurrently. Thus, it is possible for the constant current IL to flow from the output terminal 3 in the line L2 to the low electric-potential point VEE through the NMOS transistor QN2, as well as for the constant current IH to flow from the output terminal 3 in the line L2 to the low electric-potential point VEE through the NMOS transistor QN3. That is to say, if the input data signal VIN is '0', then it is possible for the constant currents IH and IL to respectively flow in the lines L1 and L2 (more specifically, transmission lines 4 and 5), and if the input data signal VIN is '1', then it is possible for the constant currents IL and IH to respectively flow in the lines L1 and L2 (more specifically, transmission lines 4 and 5).

The output terminal 2 and the output terminal 3 of the sending device may respectively be connected to input terminals 6 and 7 of the receiving device, through the transmission lines 4 and 5. The input terminals 6 and 7 of the receiving device function as receiving nodes (receiving terminals) that receive the differential current signals in reverse phase to each other. The differential current signals pair IH and IL, respectively flowing through the transmission lines 4 and 5, have the same direction of current (the directions the currents IH and IL actually flow are both from the receiving device to the sending device), but have a different amount of currents. For example, IH is 500 μA, and IL is 100 μA.

The receiving device may be a receiving device for data transfer with the differential-current driven model having: receiving nodes 6 and 7, that receive the differential current signals that are in reverse phase to each other; a pair of a positive-phase side and a negative-phase side receiving circuits, respectively connected to the receiving nodes 6 and 7; a comparator COMP to extract the fluctuation of the differential current as a voltage fluctuation, by inputting each of the outputs from the positive-phase side and the negative-phase side receiving circuits and comparing them; and a comparator output terminal 8.

Both the positive-phase side and the negative-phase side circuits may have the same circuit structure. The positive-phase side receiving circuit includes: the receiving node 6 for receiving a positive-phase current signal; a positive metal oxide semiconductor transistor (PMOS transistor) QP1, having a current-voltage conversion function to convert current to a voltage that corresponds to the positive-phase current signal from the receiving node 6; an impedance matching device 11, applied between the receiving node 6 and the PMOS transistor QP1 that has a current-voltage conversion function, and matches the input impedance of the receiving node 6 to the characteristic impedance Z0 of the sending side transmission line 4, which connects the input impedance of the receiving node 6 to the receiving node 6; and a high electric-potential power source VDD line. The characteristic impedance Z0, for example, is 50 Ω.

In PMOS transistor QP1, a gate and a drain may be commonly connected, and the source may be connected to a high electric-potential power source VDD. Current is expressed in a formula "$I=\beta p(VDD-VR-Vthp)^2/2$" (^ means "to the power of"), where the drain voltage is VR, the current flowing between the source and the drain is I, the gain factor is βp, and the threshold is Vthp. Therefore, if I=IH, the drain voltage VR of the PMOS transistor QP1 is determined accordingly. More specifically, if the current IH flows, the voltage VH that corresponds to each factor of the formula emerges. In other words, current can be converted to voltage.

The impedance matching device 11 is applied between the receiving node 6 and the PMOS transistor QP1 that has a current-voltage conversion function. The impedance matching device includes a low impedance circuit device 12 that is able to generate a low impedance, as the input impedance of the receiving node 6, which is equal to or lower than the characteristic impedance Z0 of the sending side transmission line 4. The sending side transmission line 4 is connected to the receiving node 6, as well as a resistor R1 for compensating the deficiency of impedance necessary for matching. The impedance matching device matches the input impedance to the characteristic impedance Z0 of the sending side transmission line 4.

Similarly, the negative-phase side receiving circuit includes: the receiving node 7 to receive a negative-phase current signal; a PMOS transistor QP2, having a current-voltage conversion function to convert current to a voltage that corresponds to the negative-phase current signal from the receiving node 7; an impedance matching device 13, applied between the receiving node 7 and the PMOS transistor QP2 that has a current-voltage conversion function, and matches the input impedance of the receiving node 7 to the characteristic impedance Z0 of the sending side transmission line 5, which connects the input impedance of the receiving node 7 to the receiving node 7; and a high electric-potential power source VDD line.

The impedance matching device 13 may be applied between the receiving node 7 and the PMOS transistor QP2 that has a current-voltage conversion function, and has a low impedance circuit means 14 that is able to generate a low impedance, as the input impedance of the receiving node 7, which is equal to or lower than the characteristic impedance Z0 of the sending side transmission line 5 that is connected to the receiving node 7, as well as a resistor R2 for compensating the deficiency of impedance necessary for matching, and matches the input impedance to the characteristic impedance Z0 of the sending side transmission line 5.

The comparator COMP may be fed the voltage signals as the comparison signal from each of the drains of PMOS transistor QP1 and QP2 that have the current-voltage conversion function, and outputs its comparison result as the output data to the output terminal 8.

Hereafter, the low impedance circuit device 12 and the low impedance circuit device 14 are described.

The low impedance circuit device 12 includes: an NMOS transistor QN5, having a current control function to control the current that flows between the drain (and the gate) of the PMOS transistor QP1 that has the current-voltage conversion function and the receiving node 6, with a voltage supplied to the gate; and an inverter INV3, serving as the voltage inversion device, to invert the source-side voltage of the NMOS transistor QN5, and for feed-backing the inverted voltage to the gate of the NMOS transistor QN5 as a control signal.

The low impedance circuit device 14 has: an NMOS transistor QN6, having a current control function to control the current that flows between the drain (and the gate) of the PMOS transistor QP2 that has the current-voltage conversion function and the receiving node 7, with a voltage supplied to the gate; and an inverter INV4, serving as the voltage inversion device, to invert the source-side voltage of the NMOS transistor QN6, and for feed-backing the inverted voltage to the gate of the NMOS transistor QN6 as a control signal.

If the required impedance of the impedance matching device 11 for the impedance matching with transmission line 4 is obtained by the low impedance circuit device 12, the resistor R1 is not specifically necessary. Similarly, if the required impedance of the impedance matching device 13 for the impedance matching with transmission line 5 is obtained by the low impedance circuit device 13, the resistor R2 is not specifically necessary.

However, the impedance matching device 11 may have a structure, where, among the impedances necessary to match impedance with the transmission line 4, an impedance that is smaller than the impedance necessary to match impedance with the transmission line 4 is generated by the low impedance circuit device 12, and a deficiency (shortage) of impedance necessary to match is compensated with the resistor R1. Similarly, the impedance matching device 13 may have a structure, where, among the impedances necessary to match impedance with the transmission line 5, an impedance that is smaller than the impedance necessary to match impedance with the transmission line 5 is generated by the low impedance circuit device 14, and a deficiency (shortage) of impedance necessary to match is compensated with the resistor R2.

Moreover, the impedance matching device 11 may have a structure that makes the impedance generated by the low impedance circuit device 12 be almost zero, and compensates almost the entire impedance necessary to match with a resistor R1. Similarly, the impedance matching device 13 may have a structure that makes the impedance generated by the low impedance circuit means 14 be almost zero, and compensates almost the entire impedance necessary to match with a resistor R2.

Figure 2:
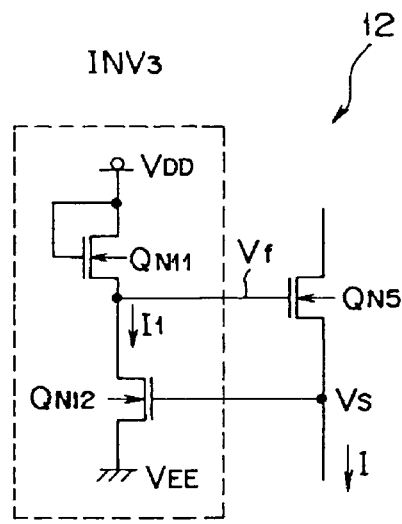
FIG. 2 is a schematic to show an exemplary structure of a low impedance circuit device.
Figure 3:
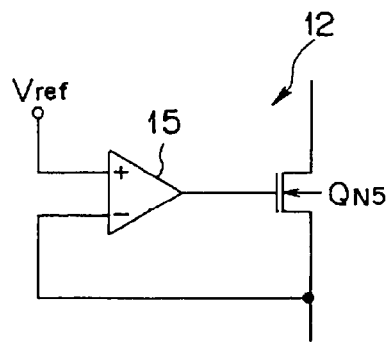
FIG. 3 is a schematic to show another exemplary structure of a low impedance circuit device.
Figure 4:
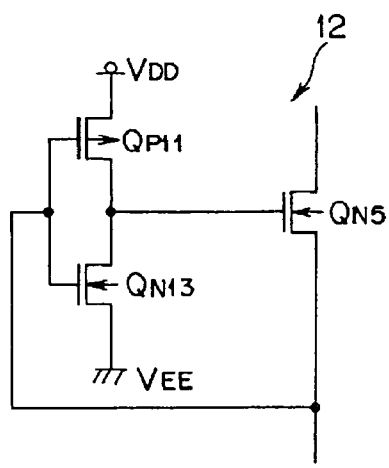
FIG. 4 is a schematic to show another exemplary structure of a low impedance circuit device.

FIG. 2 through FIG. 4 show an exemplary embodiment of the structure for the low impedance circuit device 12 (or the low impedance circuit device 14).

In FIG. 2, the inverter INV3 (or the inverter IV4) that inverts the source voltage of the NMOS transistor QN5 that has the current control function and feeds the voltage back to the NMOS transistors QN5, may be composed of 2 NMOS transistors QN11 and QN12, connected serially between the high electric-potential power source VDD and the low electric-potential side power source VEE. The drain and the gate of the NMOS transistor QN11 may be commonly connected, connecting to the high electric-potential power source VDD. The connecting point of the NMOS transistors QN11 and QN12 may be connected to the gate of the NMOS transistor QN5. The source of the NMOS transistor QN5 may be connected to the gate of the NMOS transistor QN12. The source of the NMOS transistor QN12 may be connected to the low electric-potential side power source VEE. The feedback signal Vf may be a voltage signal in which a source voltage VS of the QN5 is inverted.

The input impedance of the receiving node 6 and the receiving node 7 actually obtained from this composition is around 10 Ω through 50 Ω. Hence, in the case where the characteristic impedances Z0 of the transmission lines 4 and 5 are 50 Ω, and the input impedance is dropped to 10 Ω, the resistance for the resistors R1 and R2 should be set to 40 Ω each.

The low impedance circuit device 12 shown in FIG. 3 may be structured to use a differential amplifier 15 having negative and positive input terminals, instead of the inverter INV3, as shown in FIG. 1. The source voltage of the NMOS transistor QN5 is connected to the negative terminal of the differential amplifier 15, whereas the positive terminal of the differential amplifier 15 is connected to a standard electric-potential source Vref, and an output terminal of the differential amplifier 15 is connected to the gate of the NMOS transistor QN5.

The low impedance circuit device 12, shown in FIG. 4, is structured to use a complementary metal oxide semiconductor (CMOS) inverter composed with a PMOS transistor QP11 and a NMOS transistor QN13 that are connected serially between the high electric-potential power source VDD and the low electric-potential power source VEE, instead of the inverter INV3, shown in FIG. 1. The source voltage of the NMOS transistor QN5 is connected to the common connection gate of the MOS transistors QP11 and QN13 that compose the CMOS inverter. The connecting point (output point) of the MOS transistor QP11 and QN13 is connected to the gate of the NMOS transistor QN5.

Thus, in an exemplary embodiment, with the above-described receiving device, it is possible to match the input impedance of the receiving device to the characteristic impedance, even with the receiving device composed with the MOS transistor.

[Exemplary Embodiment 2]

Figure 5:
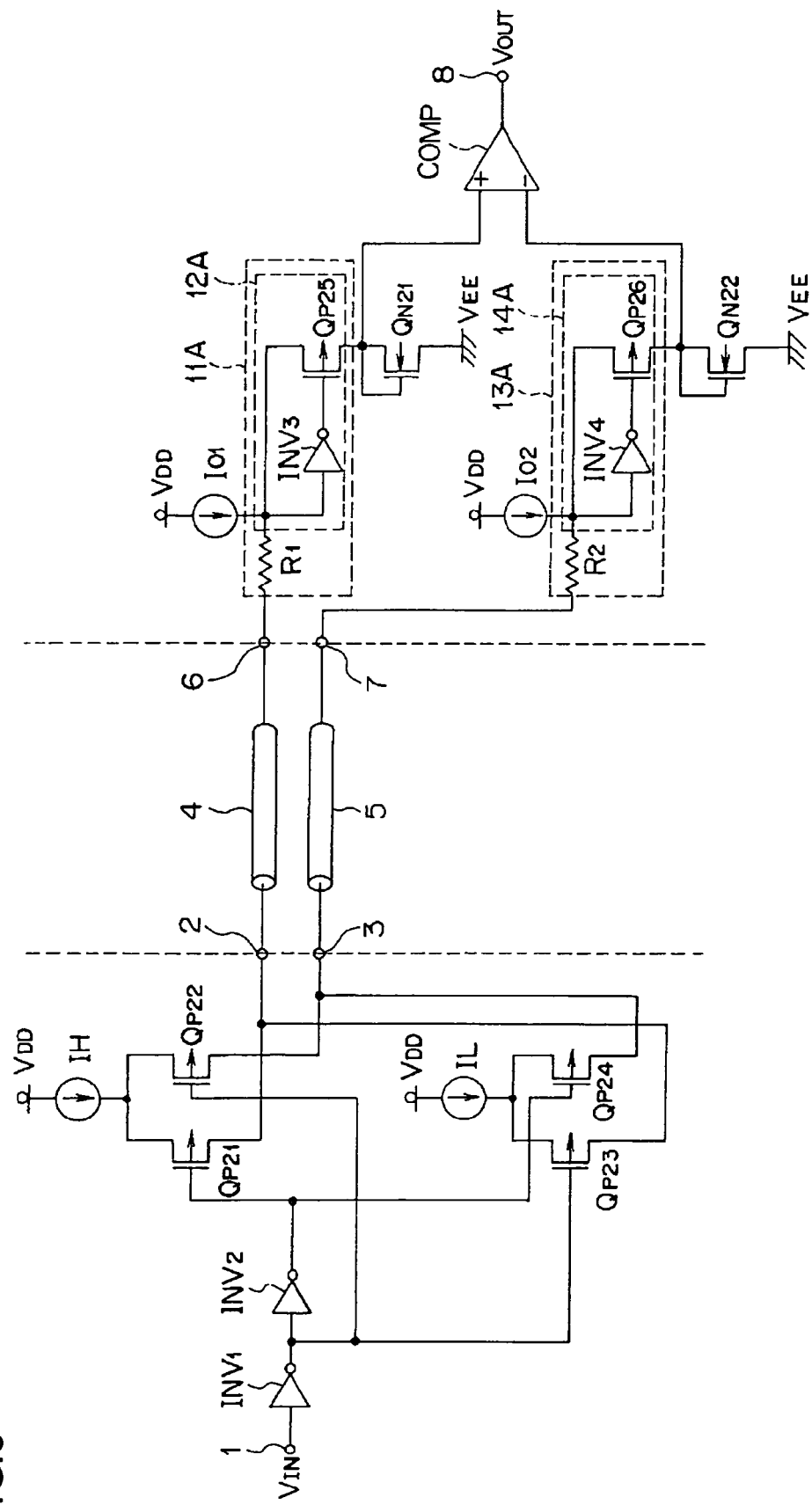
FIG. 5 is a schematic to show a sending and the receiving device of exemplary embodiment 2 of the present invention.

FIG. 5 is a schematic showing the sending and the receiving devices in an exemplary embodiment 2 of the present invention. The same signs are used for the same parts described in FIG. 1.

In exemplary embodiment 2 shown in FIG. 5, the NMOS transistors QN1 through QN6 in FIG. 1 of exemplary embodiment 1 are altered with PMOS transistors QP21 through QP26, and the PMOS transistors QP1 and QP2 in exemplary embodiment 1 are altered with NMOS transistors QN21 and QN22. Corresponding to the alternation, the arrangement of the constant-current source IH and IL changes. Hence, constant-current sources 101 and 102 are a required structure in the receiving device. An impedance matching device 11A in the receiving device is composed of the PMOS transistor QP25 that has the current control function, and the inverter INV3 that has the voltage inversion function. An impedance matching device 13A is composed of the PMOS transistor QP26 that has the current control function, and the inverter INV4 that has the voltage inversion function. QN21 and QN22 are the NMOS transistors that structure the current-voltage conversion device.

In the exemplary embodiment 2, as shown in FIG. 5, if the data input signal VIN is '0', it is possible for the constant currents IL and IH to flow in the transmission lines 4 and 5, respectively. Further, if the input signal VIN is '1', it is possible for the constant currents IH and IL to flow in the transmission lines 4 and 5, respectively. The input terminals 6 and 7 of the receiving device function as receiving nodes (receiving terminals) that receive the differential current signals in reverse phase to each other. The differential current signals pair IH and IL, respectively flowing through the transmission lines 4 and 5, have the same direction of current (the directions the current IH and IL actually flow are both from the sending device to the receiving device), but have a different amount of currents. For example, IH is 500 µA, and IL is 100 µA.

With the receiving device of exemplary embodiment 2 of the present invention, in the same way as in exemplary embodiment 1, it is possible to match the input impedance of the receiving device to the characteristic impedance, even with the receiving device composed with the MOS transistor.

As described above, both of these exemplary embodiments show examples of the structure with semiconductor integrated devices using the MOS transistors, yet it is also possible to embody the exemplary embodiments with semiconductor integrated devices using bipolar transistors.

EXEMPLARY INDUSTRIAL AVAILABILITY

The exemplary embodiments are particularly effective in sending and receiving devices in semiconductor integrated devices that are driven in high-speed as well as in low voltage.

What is claimed is:

1. A receiving device for data transfer with a differential-current driven model, comprising:
   a first receiving node connected to a first transmission line and a second receiving node connected to a second transmission line for receiving a differential current signal;
   a first current-voltage conversion device to convert current into a voltage corresponding to a first current signal from the first receiving node;
   a first impedance matching device to match input impedance to characteristic impedance of the first transmission line, installed between the first receiving node and the first current-voltage conversion device, including a first low impedance circuit device that enables generation of a low impedance which is lower than the characteristic impedance of the first transmission line that is connected to the first receiving node as an input impedance of the first receiving node;
   a second impedance matching device to match input impedance to characteristic impedance of the second transmission line, installed between a second receiving node and a second current-voltage conversion device, including a second low impedance circuit device that enables generation of a low impedance which is lower than the characteristic impedance of the second transmission line that is connected to the second receiving node as an input impedance of the second receiving node; and
   a comparator into which a differential-voltage signal from the first and the second current-voltage conversion devices input as a comparison signal, and outputs a comparison result thereof as an output data.

2. The receiving device according to claim 1, the first low impedance circuit device including:
   a first current control device to control the current flowing between the first current-voltage conversion device and the first receiving node; and
   a first voltage inversion device to invert the output terminal voltage of the first current control device, and supply the inverted voltage to the first current control device as a control signal.

3. The receiving device according to claim 1, the first impedance matching device having a structure, where, among the impedances necessary for impedance matching with the first transmission line, an impedance that is smaller than the impedance necessary to match being generated by the first low impedance circuit device, and a deficiency of impedance necessary to match being compensated with a resistor; and
   the second impedance matching device having a structure, where, among the impedances necessary for impedance matching with the second transmission line, an impedance that is smaller than the impedance necessary to match being generated by the second low impedance circuit device, and a deficiency of impedance necessary to match being compensated with a resistor.

4. The receiving device according to claim 1, the first impedance matching device having a structure that makes the impedance generated by the first low impedance circuit device almost zero, and compensates almost the entire impedance necessary to match with a first resistor,
   the second impedance matching device having a structure that makes the impedance generated by the second low impedance circuit device almost zero, and compensates almost the entire impedance necessary to match with a second resistor.

5. The receiving device according to claim 1,
the first low impedance circuit device including:
- a first current control device to control the current flowing between the first current-voltage conversion device and the first receiving node, and
- a first voltage inversion device to invert the output terminal voltage of the first current control device, and supply the inverted voltage to the first current control device as a control signal; and the second low impedance circuit device including:
- a second current control device to control the current flowing between the second current-voltage conversion device and the second receiving node, and
- a second voltage inversion device to invert the output terminal voltage of the second current control device, and supply the inverted voltage to the second current control device as a control signal.

* * * * *